United States Patent [19]

Berkowitz et al.

[11] 3,946,404

[45] Mar. 23, 1976

[54] DIRECT CURRENT BIAS FIELDS FOR MAGNETIC PRINTING

[75] Inventors: Ami E. Berkowitz, Schenectady; Joseph A. Lahut, Scotia, both of N.Y.

[73] Assignee: General Electric Company, Schenectady, N.Y.

[22] Filed: Apr. 25, 1975

[21] Appl. No.: 571,594

[52] U.S. Cl. .................................. 346/74.1; 360/55

[51] Int. Cl.[2] .................... G01D 15/12; G03G 19/00

[58] Field of Search ....... 346/74.1; 360/55, 57, 125, 360/126, 127, 117, 137; 235/61.11 D

[56] References Cited

UNITED STATES PATENTS

| | | | |
|---|---|---|---|
| 3,384,899 | 5/1968 | Lagerqvist | 360/125 |
| 3,665,484 | 5/1972 | Foster | 346/74.1 |
| 3,852,525 | 12/1974 | Ichioka et al. | 346/74.1 |
| 3,864,691 | 2/1975 | Schroeder | 346/74.1 |

*Primary Examiner*—Alfred H. Eddleman
*Assistant Examiner*—Jay P. Lucas
*Attorney, Agent, or Firm*—Jack E. Haken; Joseph T. Cohen; Jerome C. Squillaro

[57] ABSTRACT

Recording head current in magnetic printing systems is reduced by application of a direct current magnetic bias field. The bias and recording fields add to produce a sum field with sufficient strength to switch a premagnetized recording medium. The bias field may be applied directly to the surface of the recording medium or may be concentrated at the recording medium surface by pin poles.

In one embodiment of the invention the bias field is supplied by a permanent magnet common pole in a pin pole-type recording head array.

19 Claims, 5 Drawing Figures

DIRECT CURRENT BIAS FIELDS FOR MAGNETIC PRINTING

CROSS REFERENCE AND INCORPORATION BY REFERENCE

This appplication is related to copending U.S. patent application Ser. No. 571,595 by Ami E. Berkowitz. The above-mentioned patent application and U.S. Pat. Nos. 3,581,390 and 3,639,699 are incorporated herein by reference.

BACKGROUND OF THE INVENTION

This invention concerns structures and methods for magnetic image recording. More specifically, this invention concerns magnetic biasing methods and structures for economical image recording in magnetic printing systems.

Machines for producing printed copy form a latent image which is recorded on a magnetic medium are well known to the reproduction arts. Typically, an original image is optically scanned to produce an electrical signal which varies in intensity with the brightness of the original image. The electrical signal, which may for example be stored and regenerated in a computer memory, is applied to magnetic recording heads which produce a sequentially varying magnetic field. The surface of a magnetic recording medium, for example, a drum or an oxide coated tape, moves past the recording heads through the varying magnetic field. A latent magnetic image corresponding to the brightness of the original image is thus recorded on the surface of the magnetic medium. A magnetic ink which may be in the form of particles comprising finely divided ferrogmagnetic powder and a plastic resin, is applied to the surface of the recording medium where it is attracted by the magnetic field variations of the latent image. The ink image is then transferred from the magnetic medium to a final copy material, typically paper, by any of a variety of well-known processes which include electrostatic transfer and pressure transfer. The latent image recorded on the magnetic medium may then be re-inked for printing additional copies or erased to permit the medium to be used for printing a new image.

Typical magnetic printing systems employ a large plurality of magnetic recording heads for separately addressing and recording image points on magnetic recording medium. The recording heads are typically physically small and employ a limited number of conducting turns in an exciting winding. High speed printing operating dictates that the current flow through the exciting windings be in the form of narrow pulses. Large peak head drive currents are typically required to produce a magnetic field capable of saturating the magnetic recording medium with a small number of exciting winding turns.

The cost of circuitry for driving high speed magnetic recording heads generally increases sharply with the peak current required. Large numbers of driver circuits are typically required for magnetic printing applications. It is, therefore, desirable to reduce the peak drive current requirements and therefore the total head current driver cost in magnetic printing applications.

The ferromagnetic ink utilized in magnetic printing applications is attracted by variations in the magnetic field of a latent recorded image. Maximum ink density is, therefore, associated with the image areas incorporating large numbers of magnetic field reversals. Magnetic field reversals may be recorded by applying pulses of opposite polarity to adjacent recording heads in contact with the recording medium. Magnetic field reversals may also be recorded by applying unidirectional pulses to alternate magnetic recording heads to selectively reverse the polarity of a uniformly magnetized medium.

Briefly stated, copending U.S. patent application Ser. No. 571,595 describes an integrated, pin-type recording head array suitable for magnetic printing applications. One pole of the recording head array comprises a sheet of magnetic material while the remaining poles comprise pin cores wrapped with field coils.

SUMMARY OF THE INVENTION

In accordance with the present invention, the direction of magnetization of a premagnetized, saturable, recording medium is selectively reversed by unidirectional pulses which are applied to an array of magnetic recording heads. A unidirectional magnetic bias field, applied in the vicinity of the recording heads, is selected with a magnitude which is insufficient, acting alone, to switch the orientation of the tape magnetization. The magnetic field induced by the recording head current pulse adds with the bias magnetic field to produce sum fields with magnitudes sufficient to switch the tape orientation.

In one embodiment of the invention, the recording heads comprise integrated, planar, single turn recording heads of the type more fully described in U.S. Pat. Nos. 3,581,390 to D. S. Rodbell on June 1, 1971. The magnetic bias field is applied directly to the surface of the recording medium and normal to the plane of the recording head. The magnetic poles of this recording head comprise thin sheets of magnetic material disposed normal to the bias field and are thus insensitive to the limiting effects of magnetic saturation which a bias field would induce in other recording head configurations.

In another embodiment of the invention, the recording heads comprise core pairs including magnetically soft pins wrapped with multi-turn field coils and oriented at angles to the surface of the recording medium. A magnetic field is applied to the heads in the plane of the core pairs and acts to induce a unidirectional magnetic bias field across the head recording gap. This magnetic head configuration contains large air gaps and is relatively insensitive to magnetic saturation effects which a d.c. bias field would induce on a closed-core head structure.

The magnetic bias field may be induced by permanent magnets adjacent to the recording head or may be induced by direct current Hemholtz coils or other magnetic field generating means.

It is, therefore, an object of this invention to provide methods and structures for reducing the drive current requirements in magnetic image recording heads.

Another object of this invention is to reduce the cost of recording head drive circuitry in magnetic printing machines.

BRIEF DESCRIPTION OF THE DRAWINGS

The novel features believed to be characteristic of the present invention are set forth in the appended claims. The invention itself, together with further objectives and advantages thereof, may best be understood with reference to the following detail description, taken in connection with the appended drawings in which:

DESCRIPTION OF THE PREFERRED EMBODIMENT

The recording heads in a magnetic printing machine are, typically, designed to excite relatively small areas on the surface of a magnetic recording medium. By way of example, in present machines each picture element may comprise 2 mm$^2$ or less surface area. The magnetic recording heads must, therefore, be of extremely compact construction with narrow center-to-center spacing. These physical constraints are, typically, realized in recording head structures which are characterized as having a small number of turns in an exciting winding.

The magnetic field strength generated by a recording head is proportional to the number of turns in the exciting winding multiplied by the current flowing in that winding. A relatively high drive current must, therefore, be applied to the relatively small winding of the recording heads used in magnetic printing systems in order to produce a magnetic field of sufficient strength to saturate the recording medium.

The cost of available semiconductor components for high current magnetic head driving circuits is substantially greater than the cost of similar semiconductor components for use in lower current head driving circuits. Alternatively, current transformers can be used to achieve high head current drive from low current semiconductor circuits. The cost of these current transformers, however, adds substantially to the cost of the head driving circuits. A typical printing machine may incorporate hundred or thousands of recording heads and associated drive circuits. It is desirable, therefore, to reduce the drive current requirements and the associated drive circuit costs in such a machine.

The magnetic recording medium in the description of the preferred embodiments of this invention is, for ease of explanation, illustrated as an oxide coated, magnetic recording tape. It is to be understood, however, that the methods of the present invention are equally applicable to magnetic printing machines incorporating other forms of magnetic recording media (for example, a rotating magnetic drum).

Figure 1:
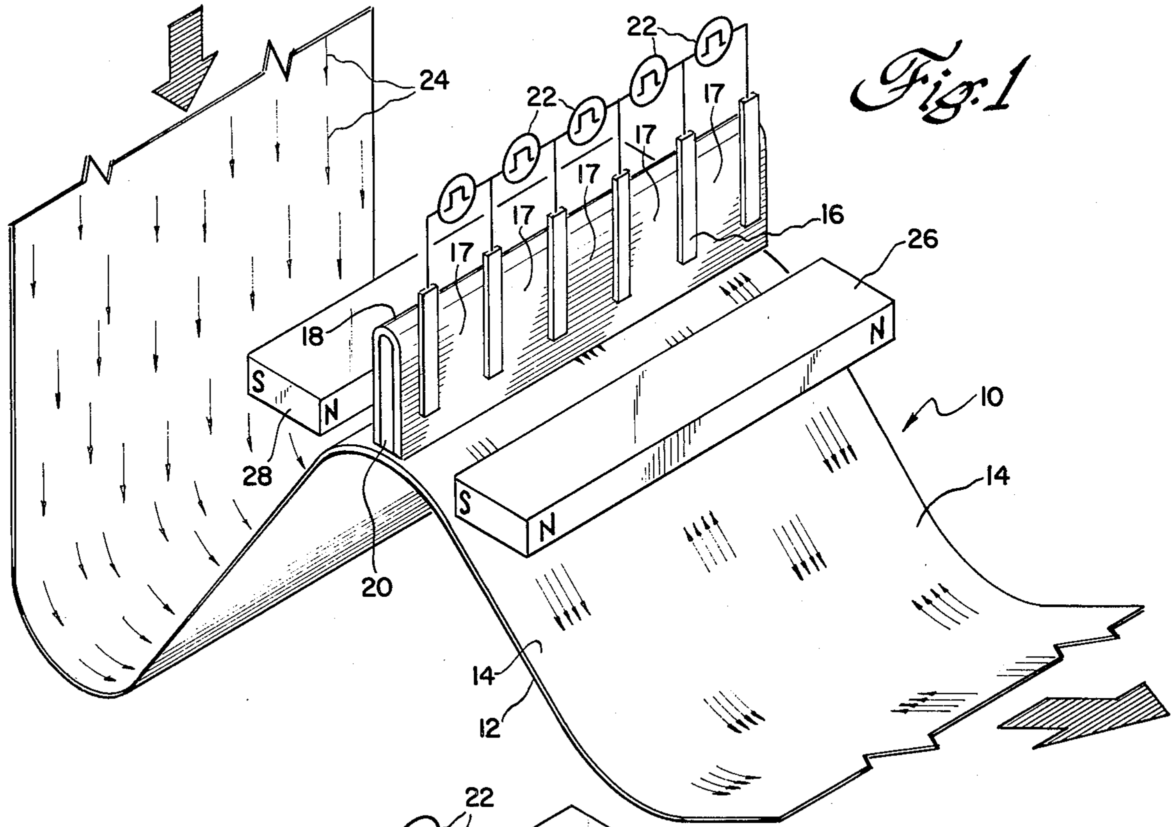
FIG. 1 is a recording structure, in accordance with the present invention, which utilizes single turn, planar recording heads and a permanent magnet bias field in the plane of the recording medium.

FIG. 1 is an embodiment of the present invention wherein recording head current is reduced by the application of a direct current, magnetic bias field to the surface of the recording medium. A magnetic recording tape 10 comprising a plastic resin backing layer 12 and a ferromagnetic recording layer 14 moves past a magnetic recording head array 16. The magnetic recording tape 10 is typically of the type having a relatively square magnetic hysteresis loop, and by way of example, may comprpise a gamma ferric oxide coated video recording tape which is characterized by a 330 oersted coercive force at saturation. The magnetic recording head array 16 is of an integrated, planar type comprising a flat sheet of electrical conductor 20 and an outer coating of permeable magnetic material 18. Magnetic recording head structures of this construction are more fully described in U.S. Pat. No. 3,581,390 to D. S. Rodbell and in U.S. Pat. No. 3,639,699 to J. J. Tiemann. The magnetic recording head 16 comprises a plurality of separate recording segments 17, each of which is separately connected, in a manner more fully described in the above-referenced Rodbell patent, to one of a plurality of pulsed, current driving circuits 22. The drive circuits 22 are adapted to respond to image information and to produce current flow in segments of the conductor 20 whereby elements of a magnetic latent image are recorded in the magnetic oxide layer 14.

The surface layer 14 of the magnetic tape 10 is premagnetized by an external magnetic field (not shown) in a first direction 24, normal to the plane of the recording head 16. The current flow in the recording head segments acts to reverse the magnetic field polarity in the oxide layer lying beneath that recording head segment. The image recording process of the present invention may, therefore, be characterized as a unipolar recording process.

In accordance with the present invention, we provide a direct current bias magnetic field in the plane of the magnetic tape surface beneath the recording heads. The strength of the bias magnetic field is insufficient, by itself, to to switch the direction of the premagnetized field 24 in the tape surface 14. In a manner more fully described below, the bias magnetic field adds to the magnetic field generated by the recording heads and thereby switches the direction of magnetization in the tape surface 14. The bias field is generated by a pair of permanent magnets 26 and 28 in the plane of the magnetic tape 10. Alternately the bias field may be generated by any other magnetic field generating means, which are commonly known, for example, Hemholtz coils.

Direct current magnetic bias of the recording tape surface is generally impractical with other recording head structures of the prior art. A magnetic field of sufficient strength to provide a useful bias effect in the surface of a recording medium will, in general, incorrectly magnetize structures of the associated recording head array and render the recording head inoperative. In the present invention, the magnetic structures associated with the recording heads are thin, flat planes lying normal to the bias magnetic field and are, therefore, insensitive to saturation by that field.

Figure 2:
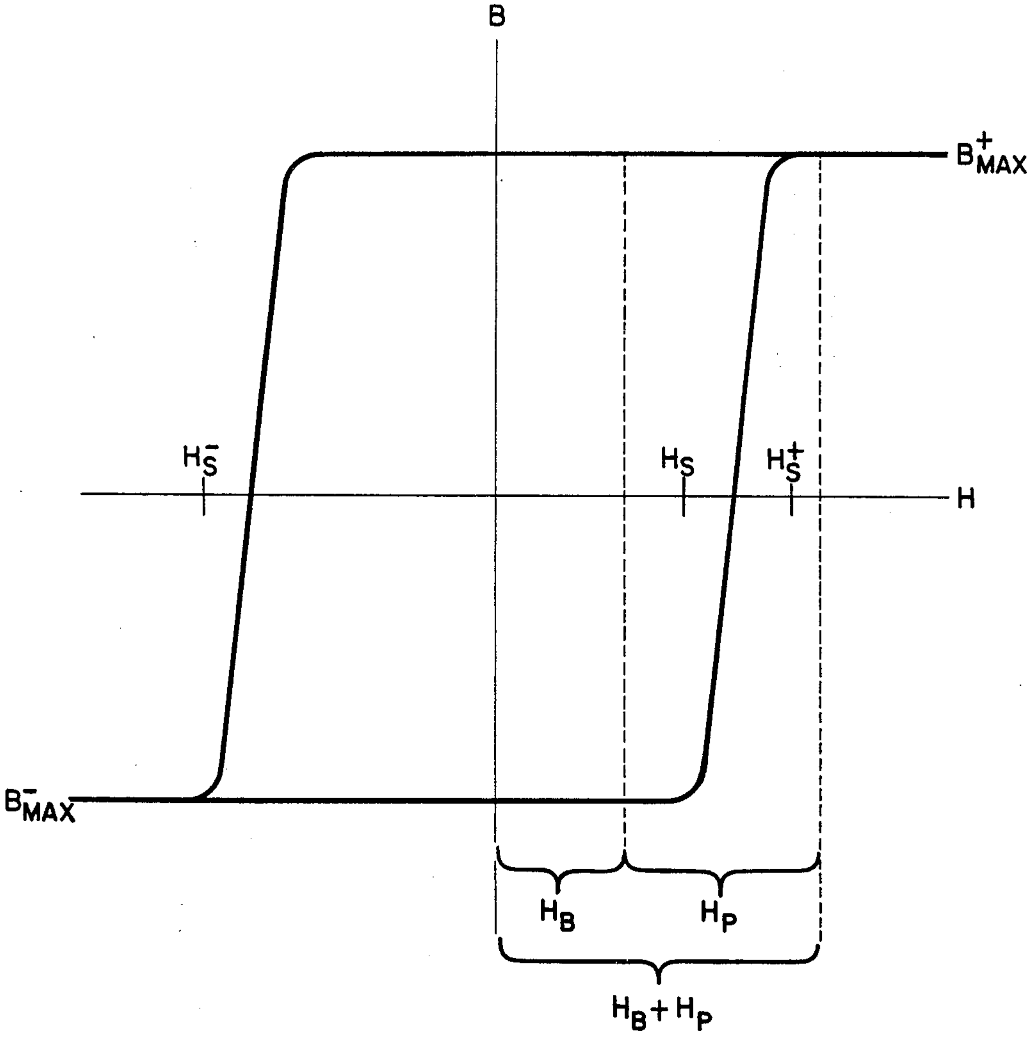
FIG. 2 is a relative plot of magnetic flux density vs. magnetic field strength for typical magnetic recording media.

The operation and advantage of a direct current magnetic field bias applied to the surface of a magnetic recording medium may be understood by reference to FIG. 2 which is a plot of magnetic flux density vs. magnetic field strength for a typical magnetic recording medium. The magnetic recording medium is initially premagnetized at the level $B^-_{MAX}$ by a magnetic field with a strength in excess of $H_S^-$. The direct current bias field has a strength $H_B$ which is less than the magnetic field strength, $H_S$, which is necessary to initiate switching of the recorded magnetic field. The current pulse applied to the magnetic recording head produces a magnetic field with a strength, $H_p$, which is less than the field strength, $H_S$, that is necessary to switch the tape but which, when added with the bias field, $H_B$, produces a magnetic field strength in excess of the field strength, $H_S^+$ which is necessary to switch the direction of the magnetic field in the recording medium and to saturate that medium with a magnetic field in the opposite direction. The indicated relationships may be expressed mathematically as:

$$H_P < H_S$$

$$H_B < H_S$$

$$H_P + H_B > H_S^+$$

By way of example in a typical magnetic printing system, the recording medium comprises Silver Chrome II video recording tape manufactured by the Karex Corp., Sunnyvale, Calif., and characterized as a gamma ferric oxide coated tape with a coercive force of 330 oersteds. The magnetic recording heads are constructed in accordance with the Tiemann patent and have a 0.013 millimeter gap at the magnetic recording surface. In the absence of a magnetic bias field, a 700 nanosecond wide, 2.5 ampere pulse is required to switch and saturate a 0.15 $mm^2$ spot on the magnetic tape surface. A 150 oersted magnetic bias field is insufficient, by itself, to switch the magnetization of the tape oxide layer. In the presence of the 150 oersted bias field, a 700 nanosecond, 1.75 ampere pulse is sufficient to switch and saturate the magnetization of the abovementioned spot on the tape surface.

Figure 3:
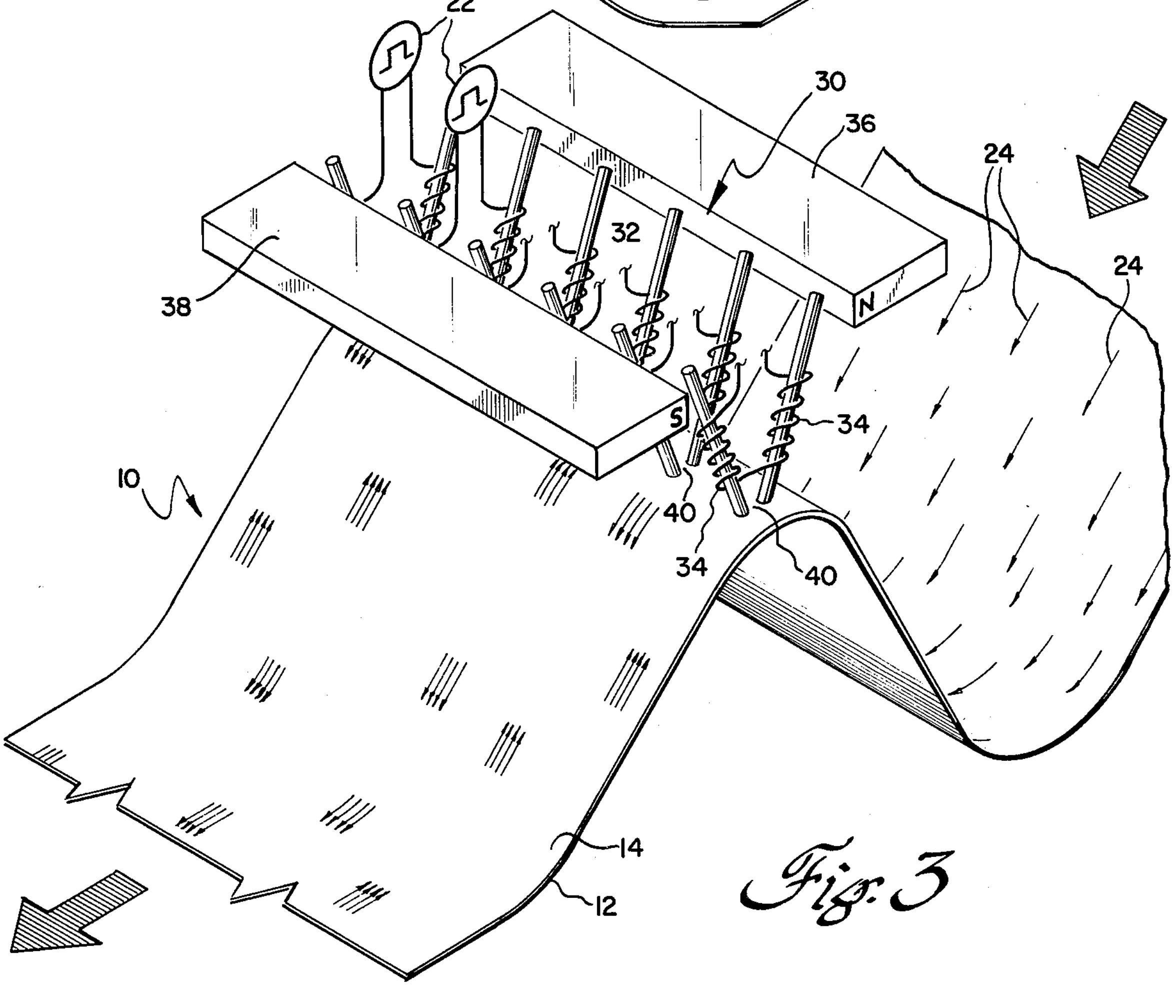
FIG. 3 is another embodiment of a magntic recording structure, in accordance with the present invention, which utilizes magnetic recording heads including pin cores.

Another embodiment of the invention, FIG. 3 comprises a magnetic recording tape 10 having a plastic resin backing layer 12 and magnetic oxide recording layer 14. As in the above-described embodiment, the magnetic tape is premagnetized (by means not shown) in a first direction 24. A plurality of magnetic recording heads 30 which, in the present embodiment, comprise a pair of permeable metal pins 32 forming an acute angle in a plane lying normal to the tape recording surface 14 and parallel to the direction of the premagnetized field 24 contact the tape surface 14. The pins 32 form a narrow gap 40 at the recording surface 14 and are wrapped with a small number of turns of a winding 34. Individual pulsed, driving circuits 22 are connected in series with the winding 34 of each recording head 30. A typical magnetic printing system comprises several hundred recording heads arrayed across the width of the recording tape 10. For ease of illustration, FIG. 3 depicts a magnetic recording system utilizing a single array of only six recording heads.

The drive circuits 22 cause electrical current flow in the windings 34 to induce a magnetic field which is concentrated at the tape surface by the permeable pins 32. As in the above-described embodiment, unidirectional pulses are applied to the recording heads 30 to reverse the direction 24 of the prerecorded magnetic field in the tape surface 14.

A pair of permanent magnets 36 and 38 provide a direct current bias magnetic field in the plane of the recording head pins 32. The bias field of the present invention embodiment, therefore, differs from the bias field of the above-described embodiment which was applied to the surface layer of the magnetic tape. The pins 32 of the recording head structure 30 concentrate the bias magnetic field at the tape surface 14. The strength of the bias magnetic field adds to the strength of the field generated by the current flow in the recording head windings 34 to produce a field at the tape surface with a strength sufficient to switch the direction of and saturate the recorded magnetic image. As in the previous embodiment, neither the strength of the magnetic field produced current flow in the recording head windings 34 nor the strength of the magnetic field produced by the concentration of the bias field by the recording head pins 32 is sufficient, taken alone, to switch the direction of magnetization of the tape. The sum of these field strengths, taken together is sufficient to switch the direction of and saturate the recorded field. The current output required from the drivers 22 is therby reduced.

Magnetic bias structures of the present embodiment are adapted to, and useful with pin type recording heads which lie in the plane of the bias field and embody a substantial air path between the tops of the pins 32. The bias method would, however, be unsuitable for use with conventional recording heads of the prior art, which comprise closed yoke structures, and which would be incorrectly magnetized by the bias magnetic field.

The pin structures 32 of the recording heads of the present embodiment serve to concentrate the bias magnetic field strength at the surface of the tape. The strength of the bias field which is applied to the pins of the recording head of the present embodiment may, therefore, be of a smaller magnitude than the strength of the magnetic field which was applied to the surface of the magnetic tape in the first-mentioned preferred embodiment. By way of example, in a printing machine incorporating pin-type magnetic heads having 0.2 mm diameter pins 32, a 0.03 mm gap 40, and a 60 turn winding 34; a 700 nanosecond, 625 milliampere pulse was required to saturate a 2 $mm^2$ spot on the surface of the previously described 330 oersted recording tape in the absence of a bias magnetic field. Upon application of a 10 oersted bias field, the pulse current required for saturation was reduced to 250 milliamperes.

Figure 4:
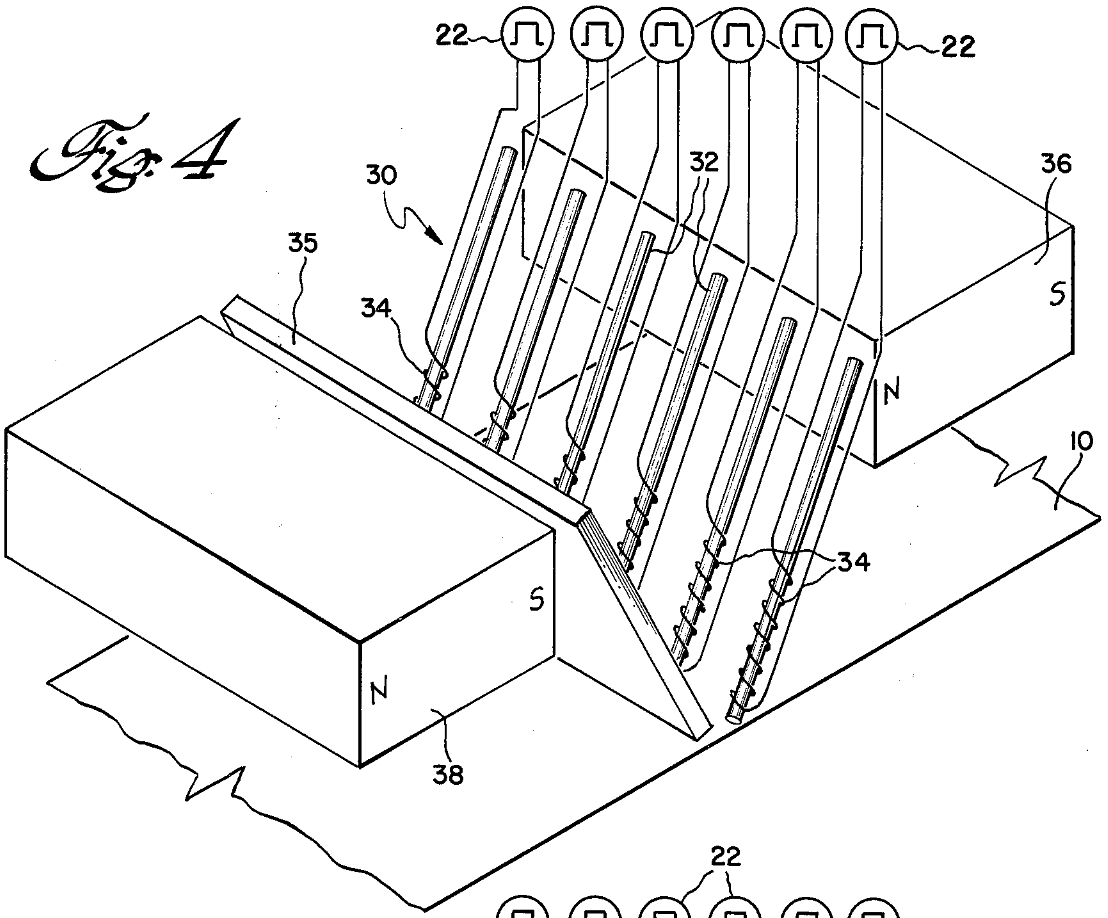
FIG. 4 is another embodiment of a magnetic recording structure which comprises a magnetic recording head including pin poles and an opposed magnetic sheet cores.

FIG. 4 is a recording structure incorporating a pin-type recording head which is more fully described in currently filed U.S. patent application Ser. No. 571,595 and which includes an array of magnetic pin cores 30 opposed to a deadhead pole 35. The pin cores are wrapped with windings 34 which are, in the manner described above, connected to pulse drive circuits 22. The deadhead pole comprises a flat sheet of magnetic material 35 and serves to increase the size of the recorded magnetic spot and to reduce the cost of the recording head array.

In accordance with the present invention, a magnetic bias field is applied in a plane passing through the deadhead sheet 35 and the pin cores 32 and parallel to the surface of a recording medium 10. The bias field is generated by a pair of permanent magnets 36 and 38 adjacent to the recording heads or by Helmholtz coils or other magnetic field generating means. The bias field of this preferred embodiment is oriented through the recording heads in the same manner as the bias magnetic field in the embodiment of FIG. 3 and is concentrated at the surface of the recording medium by the deadhead pole 35 and the pin cores 32. The magnitude of the bias field and of the pulsed drive current are determined in the manner described above.

Figure 5:
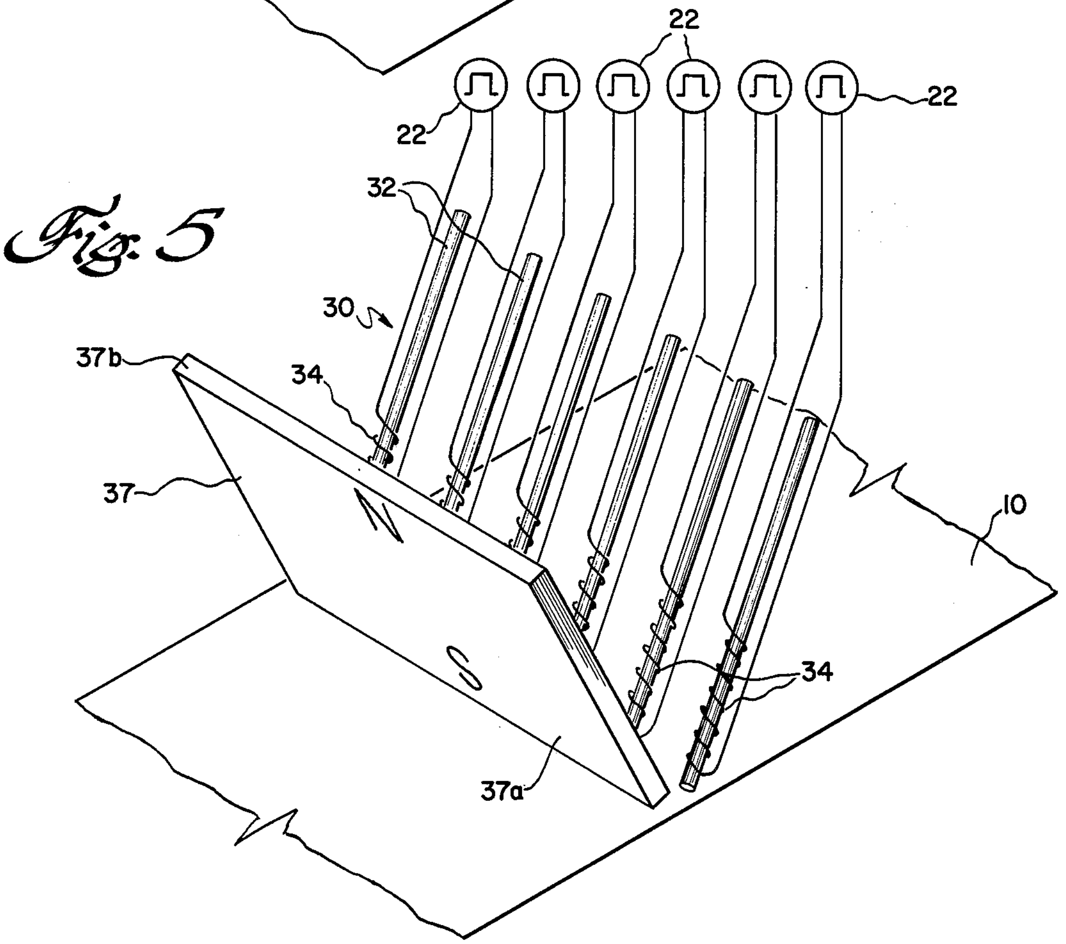
FIG. 5 is another embodiment of a magnetic recording structure wherein a bias field is generated by a permanent magnet sheet pole.

FIG. 5 is another embodiment of the present invention wherein the magnetic recording heads comprise a plurality of pin cores 32 and a deadhead pole comprising a flat sheet of magnetic material 37. As in the prior embodiments, the pin cores 32 are wrapped with field windings 34 and connected to pulsed driver circuits 32. The surface of a recording medium 10 moves past the gap formed by the pin cores 32 and the deadhead sheet 37. In this embodiment, the deadhead sheet comprises magnetically hard material: that is, permanent magnet material capable of retaining an induced magnetic field. The deadhead sheet 37 is permanent magnetized with one pole lying along the edge 37*a* of the sheet closest to the recording medium 10 and the other pole lying along the edge 36*b* of the sheet most distant from the recording medium 10. The bias field of the present embodiment is, therefore, induced directly, by the permanent magnet deadhead sheet 37 of the recording head array thereby eliminating the need for external bias field generating means (for example, the permanent magnets 36 and 38). The magnitude and direction of the magnetic field generated by the deadhead pole 37 is selected in the manner described above as in the magnitude of the currents applied by the pulsed driver circuits 22.

The above-described preferred embodiments utilize recording media which are premagnetized with a magnetic field. It is to be understood, however, that the present invention may also be practiced with magnetic recording media which are premagnitized to a zero residual field state: that is, blank or erased media.

As used herein and in the appended claims, the terms "premagntized" and "magnetized" include magnetization to a state of substantially zero residual magnetic field strength.

The direct current magnetic bias methods and structures of the present invention are particularly useful in the recording of magnetic printing images by the unipolar pulse method. The direct current magnetic bias, in the plane of the magnetic tape, reduces the drive requirements to the pulse recording heads and thereby affects considerable savings in the over-all cost of such a printing machine.

While the invention has been described in detail herein in accordance with preferred embodiments thereof, many modifications and changes therein may be effected by those sklled in the art. Accordingly, it is intended by the appended claims to cover all such modifications and changes as fall within the true spirit and scope of this invention.

The invention claimed is:

1. A method of recording magnetic information on a sheet of magnetic recording medium comprising:

premagnetizing said magnetic recording medium with a first magnetic field oriented in a first direction;

biasing said magnetic recording medium with a second magnetic field, said second magnetic field being oriented in a second direction opposite to the direction of said first magnetic field, the strength of said second magnetic field being less than the strength necessary to saturate said recording medium;

applying the poles of a recording head to said recording medium in the presence of said magnetic field; said poles defining a gap parallel to the direction of said second magnetic field;

applying electric current to said magnetic recording head, said current being adapted to produce a third magnetic field across the gap of said recording head, the strength of said third magnetic field being less than the strength necessary to saturate said recording medium and the sum of the strength of said second magnetic field and the strength of said third magnetic field being sufficient to saturate said recording medium.

2. The method of claim 1 wherein the strength of said first magnetic field is sufficient to saturate said recording medium.

3. The method of claim 2 wherein said recording head is a planar recording head.

4. The method of claim 3 wherein the plane of said recording head is normal to the direction of said second magnetic field.

5. The method of claim 2 wherein said magnetic recording head comprises separated, pin-core members oriented in a plane lying parallel to said second magnetic field.

6. The method of claim 5 wherein said magnetic recordings tape comprises gamma ferric oxide.

7. The method of claim 5 wherein said pin-core members are disposed in pairs lying at acute angles to one to the other.

8. The metod of claim 5 wherein each of said pin-core members forms an acute angle with a planar pole member.

9. The method of claim 2 wherein said recording medium is a magnetic recording tape.

10. A structure for recording information in a sheet of magnetic recording medium, said recording medium having been premagnetized with a magnetic field of a first orientation in the plane of said sheet, comprising:

means for applying a direct current magnetic bias field to said medium, said bias field having a magnitude less than the magnitude necessary to saturate said recording medium and further having an orientation opposite to the orientation of said premagnetized field; and a single turn, planar, recording head disposed in contact with said recording medium, the plane of said recording head being oriented normal to the orientation of said bias field, said head being adapted to selectively excite said recording medium with a recording magnetic field, said recording magnetic field having a force less than the force necessary to saturate said recording medium, the sum of the force of said recording magnetic field and the force of said bias magnetic field being sufficient to saturate said recording medium.

11. The structure of claim 10 wherein said medium is a recording tape.

12. The structure of claim 11 wherein said tape is coated with gamma ferric oxide.

13. The structure of claim 10 wherein said means for applying a d.c. magnetic bias field are permanent magnet means.

14. The structure of claim 10 wherein said magnetic bias field has a force of approximately 150 oersteds.

15. A structure for recording information in a planar sheet of magnetic recording medium, said medium having been premagnetized with a magnetic field in a first orientation in a plane of said sheet; comprising:

means for applying a direct current magnetic bias field to said medium, said bias field further being oriented opposite to the orientation of said premagnetized field; and a plurality of magnetic recording heads, each of said heads including pin core members forming an acute angle within a plane lying normal to said sheet and parallel to said bias field, said recording head being adapted to excite said recording medium with a recording magnetic field having a magnetic force less than the magnetic force necessary to saturate said recording medium, the sum of the magnetic force of said recording magnetic field and the magnetic force of said bias field being sufficient to saturate said recording medium.

16. The structure of claim 15 wherein each of said recording heads includes a pair of pin core members.

17. The structure of claim 15 wherein said means for applying a direct current magnetic bias field are permanent magnetic means.

18. The structure of claim 15 wherein said magnetic recording heads comprise a common, planar pole member and each of said recording heads comprises a pin core member forming an acute angle with said planar pole member.

19. The structure of claim 18 wherein said planar pole member is a permanent magnet.

* * * * *